United States Patent Office 3,154,088
Patented Oct. 27, 1964

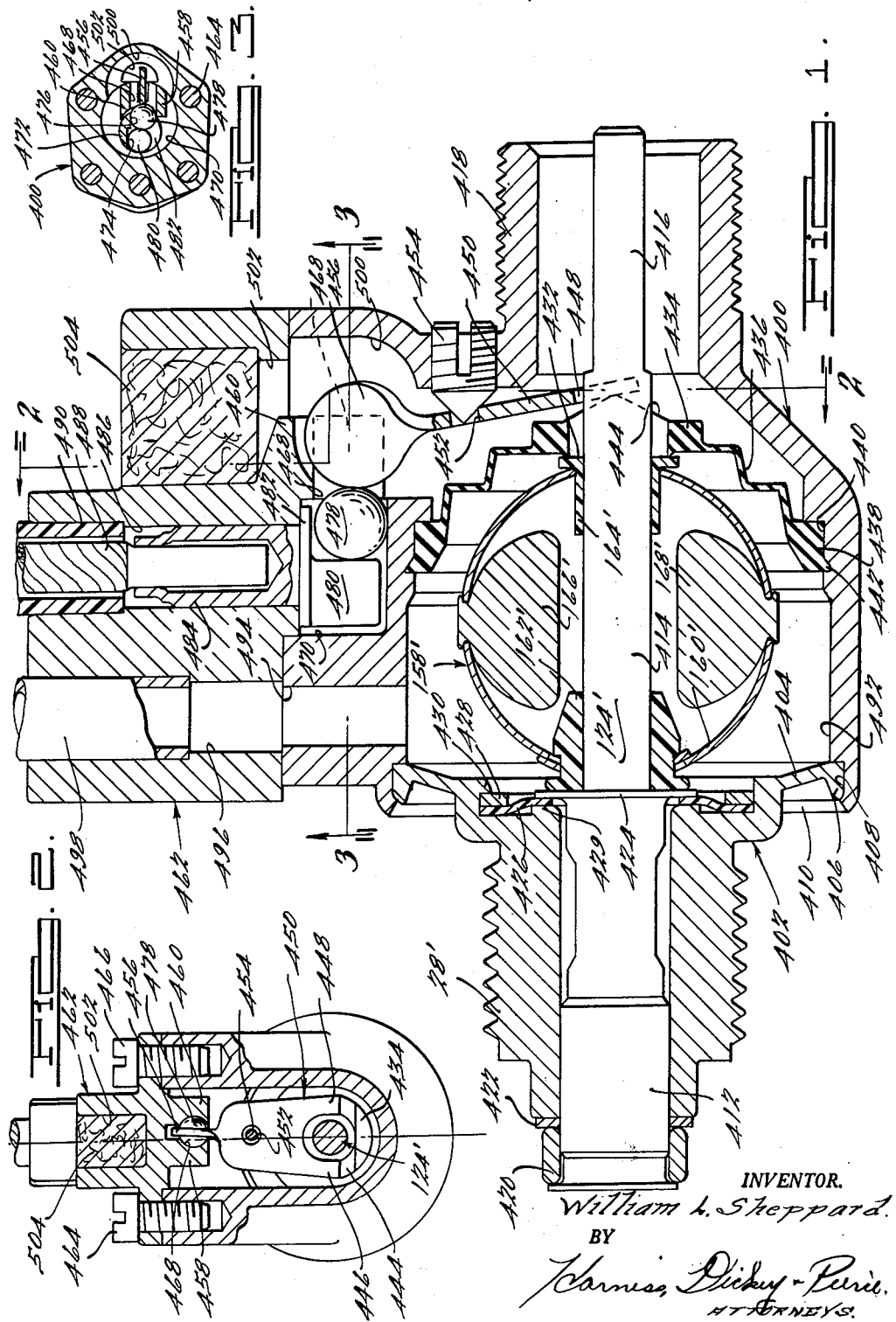

3,154,088
GOVERNOR HAVING ADJUSTABLE OUTPUT
CHARACTERISTICS
William L. Sheppard, 36655 Romulus St., Romulus, Mich.
Filed Nov. 14, 1960, Ser. No. 68,877
16 Claims. (Cl. 137—57)

This invention relates to governors.

An object of this invention is to reduce the frictional losses in governor mechanisms.

Another object of this invention is to reduce the cost of manufacture, installation and maintenance of governors.

A further object of this invention is to facilitate the adjustment of the output characteristics of governors.

Another object of this invention is to tailor the output characteristic curves of governors.

Another object of this invention is to improve the means for adjusting the relationship between the output pressure and the rotational velocities to set the governor for a selected speed.

Another object of this invention is to improve and simplify the sealing of a pressure-differential controlling governor.

Under certain of the principles of the present invention, a governor weight to be rotated is supported by means of an arm the force-deflection characteristics of which vary in accordance with the velocity of rotation. In the illustrated embodiments of the invention, a curvilinear arm, formed of spring metal, is mounted upon a rotatable shaft and secured to a weight having a curved surface. The radial deflection of the weight resulting from rotation of the shaft and arm produces an increase in the area of engagement between the arm and the curved surface of the weight and a corresponding reduction in the effective bendable length of the arm. To facilitate the control of the governor's output element, the spring is bowed to a generally semicircular or semi-elliptical shape, with two points thereon lying on the axis of rotation and with the weight being secured to the spring at a location between those two points. Means, preferably in the form of a driving clutch, are provided to inhibit relative translational movement between one of those two points on the spring and the body of the governor, whereas the other one of those two points engages the output element of the governor so as to apply a force thereto tending to move that output element in translation relative to the body of the governor, the magnitude of that force varying in accordance with the rotational velocity. That force may permit or produce substantial movement of the output element, or may permit or produce but minimal movement. In a representatively placement of the output element resulting from the application of an opposing force to that element by means such as the pressure of the controlled fluid or other biasing means. Means are provided for adjusting the relative magnitudes of the forces which are applied to the output element at any given rotational velocity.

This invention is a continuation-in-part of the invention disclosed and claimed in my application Serial No. 632,470, filed January 4, 1957, now Patent 3,064,669, granted November 20, 1962, and the specification and drawings of that application and of that patent are hereby incorporated herein by reference as fully as though they were reproduced in full herein.

The manner of accomplishing the foregoing objects, and other objects of the invention, will be perceived from the following detailed description of embodiments of the invention when read with reference to the accompanying drawings in which:

FIGURE 1 is a sectional view of a governor embodying the principles of the present invention;

FIGURE 2 is a sectional view taken substantially along the line 2—2 of FIGURE 1; and FIGURE 3 is a sectional view taken substantially along the line 3—3 of FIGURE 1.

The governor illustrated in FIGURE 1 of the drawings is representatively adapted for use as a pneumatic pressure controller in a system for governing the road speed of a vehicle. Details of such a system are disclosed in my copending application entitled "Governing System," Serial No. 632,541, filed on January 4, 1957, now abandoned in favor of applications Serial Nos. 74,833 and 74,834, both filed December 9, 1960, and the disclosures of those applications are incorporated herein by reference and are intended to be as much a part of the present disclosure as if they had been fully reproduced herein.

In the air-pressure controlling rotational-velocity responsive mechanism illustrated in FIGURES 1 through 3 of the drawings, the body means comprises a hollow main body portion 400, which may, for example, be a die casting, and an end body portion 402 having a centrally apertured fitting portion 28' and a radically extending flange portion 404 terminating in a peripheral bead 406 which is secured in an inner annular groove 408 formed in the main body portion 400 as by crimping an end flange 410 of the body 400 thereover. A shaft 124', has a support portion 412 journaled within the bore in the end body portion 402, a circular cylindrical central portion 414, and a squared end portion 416 disposed coaxially within the central aperture in a fitting portion 418 of the main body portion 400. Portion 412 of shaft 124' is provided with an internal squared recess to accept the squared end of the core of a speedometer cable, and fitting 28' is externally threaded to accept the nut at the end of the casing of a conventional speedometer cable assembly. Squared end portion 416 of shaft 124' is engageable with a squared recess in a speedometer head and fitting portion 418 is externally threaded to accept the rotatable securing nut on conventional speedometer heads.

The left-hand end of the portion 412 of shaft 124' is flared over a bearing element 420 which engages a bearing washer 422 abutting the end of the end body portion 402, thereby restricting movement of shaft 124 to the right relative to the end body portion 402. To limit movement of the shaft 124' to the left relative to the end body portion 402, a radial flange 424 on shaft 124' bears against an annular resilient sealing and bearing washer 426 which abuts the inner end face of the end body portion 402. Annular seal 426, which is desirably formed of a good bearing and sealing material such as Teflon, is clamped in position by means of a clamping ring 428 which is retained in position by crimping or staking a portion of the main body portion 402 over it at a plurality of points such as at 430.

In the preferred practice, the end body portion 402 is provided with a central, axially projecting annular seat 429 to establish an offset between the mounting plane of the clamped portion of seal 426 and the plane of the inner portion of that seal. As a result, seal 426 tends to cup, and exert forces tending to force the central portion thereof into intimate sealing engagement with flange 424 and to exert a force on flange 424 biasing shaft 124' to the right. In the illustrated arrangement, the distance between the flared-over end of portion 412 and flange 424 is such that the central portion of seal 426 is pressed substantially flat, but this need not be the case.

Disposed upon the central circular cylindrical portion 414 of the shaft 124' is a rotatable sub-assembly 158' comprising a generally annular spring 160', a clutch bushing 162', a valve bushing 164' and a pair of weights 166' and 168'. This sub-assembly 158' comprises a spring 160', a clutch bushing 162', a valve bushing 164' and a pair of weights 166' and 168'. Rectangular apertures, the ends of which are generally arcuate, are formed near each end of the spring 160' and a circular aperture is formed medially of the spring. A pair of apertures are formed along the longitudinal axis of the spring and intermediate the central aperture and the two end apertures. Element 160' is preferably of resilient material, and plated tempered spring steel has proved satisfactory in practice.

To produce governor characteristics satisfactory for certain uses, the spring 160' is preformed into a circle with the ends overlapping sufficiently to bring the end apertures into alignment with one another.

The clutch bushing 162' is preferably formed of a wear-resistant deflectable plastic, a polyamide resin commercially sold under the generic name nylon having proved to be satisfactory in use. Bushing 162' includes a centrally apertured head portion, a pair of diametrically opposed arcuate shoulders, a pair of diametrically opposed arcuate flanges integral with the shoulders and a pair of diametrically opposed axially extending arcuate fingers. The inner surfaces of the projecting fingers define, in conjunction with the central aperture in the head portion thereof, a circular cylindrical surface the diameter of which is but slightly greater than the diameter of that portion of shaft 124' with which clutch bushing 162' is associated.

Each of the weights 166' and 168' in the general form of a segment of a right circular cylinder, the radius of the cylinder being less than the radius upon which the spring 160' is preformed. In a constructed arrangement which produced a characteristic curve of satisfactory form, the radius of curvature of the major surfaces of the weights 166' and 168' was about 0.196 inch whereas the radius of curvature to which the spring 160' was formed was in the order of 5/16 of an inch, that is, in the constructed arrangement, the radius of curvature of the weights was about 37% less than the radius to which the spring 160' was preformed.

The compressing, deforming or bowing of the spring 160' into an elliptical shape effectively prestresses the spring 160' so that forces are exerted tending to move clutch bushing 162' to the left in view of FIGURE 1 and valve bushing 164' to the right. The former force tends to establish a driving relationship between the face of bushing 162' and the shoulder 424 so that the governor sub-assembly 158' will be forced to rotate with shaft 124'. The latter of these forces tends to bring the face of valve bushing 164' into intimate engagement with the valve seat. The valve portion or bushing 164' is provided with a generally annular flat face 432.

Face 432 of valve bushing 164' cooperates with and engages a narrow peripheral lip adjacent a central aperture in a valve seat portion 434 which is supported by and preferably formed integrally with a circular support diaphragm 436 provided with a plurality of circular rigidifying steps and terminating in an annular bead 438 which snaps, with an interference fit, in an annular groove 440 formed on the interior surface of the main body portion 400. In the preferred practice, the bead 438 is further provided with a small peripheral projection 442 engaging a correspondingly shaped recess in the groove 440 to improve the sealing and locking engagement between the bead 438 and the main body portion 400.

It will be observed that while element 164' has been characterized as a valve portion and element 434 has been characterized as a valve seat portion, reversal of these parts is within the contemplation of the invention and it is intended that the terms valve and valve seat may each be used interchangeably with the other.

The centrally apertured valve seat portion 434 is provided on its right-hand surface with a chisel-shaped bearing surface 444 as illustrated in FIGURES 1 and 2, to define a knife-edge bearing. Bearing 444 engages the tips of the two spaced-apart leg portions 446 and 448 (FIGURE 2) of a lever 450. It will be observed that the leg portions 446 and 448 are spaced-apart to form a yoke which straddles but is spaced from the shaft 124'.

Lever 450 is a rotatable member having an aperture therein seating upon the conical tip of an adjustable pivot screw 454 which is threaded in a side wall of the main body portion 400. Lever 450 terminates at its upper end in a narrow circular cam follower portion 456. In the illustrated arrangement, lever 450 is a steel stamping with the upper portion thereof being twisted 90° to form the cam follower portion 456, but may be otherwise formed or constructed.

The cam follower portion 456 of the lever 450 lies between and is spaced from a pair of depending arms 458 and 460 (FIGURES 2 and 3) formed upon an upper body portion 462 which is or may be a die casting and which is secured to the main body portion 400 by means of a plurality of screws including screws 464 and 466 which pass through apertures in flange portions formed upon the upper body portion 462 and engage threaded sockets in the main body portion 400.

Depending arms 458 and 460 are formed to define a circular cylindrical ball guide channel 468 which closes at the bottom to a gap which is less than the diameter of the channel but wider than the thickness of the cam follower portion 456. Ball guide channel 468 communicates with a cavity 470 (FIGURES 1 and 3) formed in the upper surface of the main body portion 400. An upstanding boss 472 (FIGURE 3) formed integrally with the upper surface of the main body portion 400, is provided with a planar crank-stop face 474 and a planar ball-locating face 476, the latter of which is aligned with the edge of the ball guide channel 468 to form an effective continuation of that edge surface and also serves as a crank-stop face.

A camming element 478, in the form of a ball, is disposed in the ball guide channel 468 and is located in its leftwardmost position (as illustrated in FIGURES 1 and 3) between the ball locating surface 462 and the edge of the depending leg portion 458 which extends to the left (FIGURE 3) of the right-hand edge of the boss 472. The camming element 478 abuts a crank arm 480 lying within the cavity 470 and secured to and preferably formed integrally with an annular flange 482 the upper surface of which bearingly engages the under surface of the upper body portion 462. A portion of the under surface of flange 482 overlies and guides the camming element 478.

A cylindrical crankshaft 484 extends upwardly from and is formed integrally with the flange 482 and is mounted in a bore 486 formed in the upper body portion 462 for rotation about an axis eccentric to the center line of the crank arm 480. Crankshaft 484 is provided with a longitudinal socket for accepting the squared end of a flexible shaft core 488 and is preferably staked or otherwise rigidly secured thereto. The casing 490 of the flexible shaft is inserted within the upper end of the recess 486.

The support diaphragm 436 is preferably resilient or springy and capable of developing an appreciable force, and in the preferred practice is made of a suitable plastic such as nylon. The stepped wall portion may be quite thin, as five or six thousandths of an inch in thickness. Even with the elements in their illustrated extreme positions, the valve seat portion 434 is displaced to the left of its free position so that the support diaphragm 436 is pretensioned and is exerting a substantial force to the right (in the view of FIGURE 1) against the lever 450, tending to rotate the lever 450 in a counterclockwise sense (in the view of FIGURE 1) about the pivot 454, thereby exerting a force tending to maintain the cam follower 456 in engagement with the camming element 478 and tending to maintain the camming element 478 in continuous engagement with the crank arm 480. Thus, the crank, the camming element 478, and the lever 450 serve as a limit stop to establish the position of the valve seat portion 434.

The right-hand face of the end body portion 402, a portion of the inner surface of the main body portion 400 and the support diaphragm 436 serve to define a chamber 492 within which the governor sub-assembly 158' is disposed. Chamber 492 communicates through a passageway 494 formed in the main body portion 400, through a passageway 496 formed in the upper body portion 462 and through an air connection pipe 498 with a source of reduced air pressure through a controlled valve or device which, for pressure modulation action of the disclosed mechanism, is assumed to have a flow-restricting orifice therein so that the pressure in chamber 492 will, under dynamic conditions, differ from the source pressure.

The right-hand face of the support diaphragm 436 is exposed to atmospheric pressure through a passageway 500 formed in the main body portion 400 and through a passageway 502 formed in the upper body portion 462 and preferably filled with a filtering material 504. With the sealing arrangement illustrated, air flows from the atmosphere into the chamber 492 and out of the air connection 498 effectively exclusively through the pneumatic valve means including the valve portions 164' and 434.

In the illustrated limit position of the equipment, the support diaphragm 436 is not only pretensioned but also, in the preferred practice, the valve face 432 is so located at this position of the equipment that the spring 160' is pretensioned and exerting a force tending to move the valve portion 164' to the right and into engagement with the valve seat portion 434.

During operation of the device, the effect of the centrifugal force upon the weights 166' and 168' resulting from rotation of shaft 124' is to reduce the magnitude of the pretensioning force exerted by spring 160' upon the valve portion 432, admitting atmospheric air into the chamber 492 and via the air connection 498 to modulate the pressure within the chamber 492 in accordance with the rotational velocity of the shaft 124'.

In the illustrated position of the crankshaft 484 and of the elements controlled thereby, a preselected relationship will exist between the presure in the chamber 492 and the various rotational velocities of shaft 124'. This relationship may be shifted, in order to select the speed at which control will be exerted, by manually rotating core 488 by any suitable means such as a remotely located knob secured thereto. When the core 488 is rotated so as to rotate the crankshaft 484, crank arm 480 is rotated about the rotational axis of crankshaft 484 to move the camming element 478 to the right in the view of FIGURES 1 and 3, to thereby rotate lever 450 in a clockwise direction about the pivot 454 and hence to move the valve seat portion 434 to the left (FIGURE 1). As a result the pretensioning force exerted upon spring 160' is increased.

As is best illustrated in FIGURES 2 and 3, it has been found that an improved relationship between changes of the angular position of crankshaft 484 and the pressure in chamber 492 can be achieved by mounting the camming element 478 and cam follower 456 to one side of the longitudinal axis of the crankshaft 484.

In order to calibrate the unit, the pivot 454 is illustrated to be adjustable and calibration can be accomplished by driving shaft 124' at a preselected speed and adjusting pivot 454 until the air pressure at air connection 498 reaches a preselected value. Alternatively it is contemplated that pivot 454 be fixed and that calibration be accomplished by rigidly supporting main body portion 400, by rotating shaft 124' at a preselected speed, and by exerting an axial force upon the end body portion 402 so as to bend and deflect the reduced cross sectional area sections of the flange portion 404 and thereby to change the distance between the valve seat portion 434 and the right hand face of the flange 424 so as to change the pretensioning of spring 160' to produce a preselected pressure at air connection 498.

As was above-noted, the support diaphragm 436 is pretensioned and resiliently exerts a substantial force to the right sufficient to hold lever 450 upon its pivot 454 and to maintain cam follower portion 460 in engagement with camming element 478 and camming element 478 in engagement with crank arm 480. This resilient force is also such that the support diaphragm will not deflect significantly to the left in response to the establishment of an air pressure differential thereacross. It will be recalled that support diaphragm 436 further serves as a seal and constitutes a portion of the wall of chamber 492. By virtue of its construction, it further serves to maintain the valve seat portion 434 centered.

While the mechanism illustrated in FIGURES 13 through 15 has been described as a pressure controlling rotational velocity responsive mechanism, it will be recognized that if there is no control orifice in the line or mechanism connected to the air connection 498, the mechanism may be utilized as an air-flow controlling rotational-velocity responsive mechanism.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

I claim:

1. In an air-pressure controlling rotational-velocity-responsive mechanism, body means having a chamber therein connectable to a source of air at a pressure differing from atmospheric, pneumatic valve means controlling the flow of air through said chamber and including an apertured valve seat portion and a valve portion engageable with said valve seat portion and having an aperture aligned with the aperture in said valve seat portion, rotatable shaft means supported for rotation about its longitudinal axis and extending through the apertures in both of said portions, rotational-velocity-responsive means disposed in said chamber for extering a force on one of said portions which varies over a range in accordance with the rotational velocity of said rotatable shaft means comprising a spring element rotatable with said shaft means and weight means on said spring element, and means for manually adjusting the relationship between the other one of said portions and said one of said portions comprising means for resiliently biasing said other portion in one direction, and manually adjustable stop means for establishing an adjustable limit to movement of said other portion in said one direction.

2. In an air-pressure controlling rotational-velocity-responsive mechanism for association with a rotatable shaft rotating at various velocities, body means having a chamber therein connectable to first and second sources of air at different pressures, pneumatic valve means for controlling the connection of said chamber to one of said sources and for controlling the flow of air in a path from the first source through said chamber and to the second source and including cooperating valve and valve seat portions, one of said portions comprising an apertured flexible and resilient diaphragm constituting a portion of the wall of said chamber and having a peripheral edge portion sealingly secured to said body means, means connecting said chamber at one side of said diaphragm to one of the sources, means connecting the other side of said diaphragm to the other one of said sources, the other one of said portions cooperating with the aperture in said diaphragm to control the flow of air from the first to the second source through said aperture in said diaphragm in accordance with the force applied to said other one of said portions, means for adjustably positioning said one of said portions, and rotational-velocity-responsive means for exerting a force on the other one of said portions which varies over a range in accordance with the velocity of rotation of the rotatable shaft.

3. In an air-pressure controlling rotational-velocity-responsive mechanism for association with a rotatable shaft rotating at various velocities, body means having a chamber therein connectable to a source of air at a pressure differing from atmospheric, pneumatic valve means for controlling the flow of air through said chamber and including cooperating valve and valve seat portions, one of said portions being supported by a flexible and resilient diaphragm constituting a portion of the wall of said chamber and having a peripheral edge portion sealingly secured to said body means and pretensioned to tend to move in one direction, means for adjustably limiting movement of said one of said portions in said one direction, and rotational-velocity-responsive means for exerting a force on the other one of said portions which varies over a range in accordance with the velocity of rotation of the rotatable shaft.

4. The combination of claim 3 in which said flexible and resilient diaphragm is integral with and additionally serves as a means for centering said one of said portions relative to the other one of said portions.

5. In an air-pressure controlling rotational-velocity-responsive mechanism for association with a rotatable shaft rotating at various velocities, body means having a chamber therein connectable to a source of air at a pressure differing from atmospheric, pneumatic valve means for controlling the flow of air through said chamber and including cooperating valve and valve seat portions, one of said portions comprising a flexible and resilient diaphragm constituting a portion of the wall of said chamber and having a peripheral edge portion sealingly secured to said body means, means for adjustably positioning said one of said portions, means exerting a first force on the other one of said portions tending to move said other portion in one direction relative to said one portion, a generally annular pretensioned spring, means for drivingly connecting said spring to the rotatable shaft, means inhibiting relative translational movement between a first portion of said spring and said body means, a second portion of said spring due to the pretensioning of said spring continuously exerting a second force on said other portion in a direction opposite to the direction of said first force, and means for varying the magnitude of said second force relative to said first force with variations in the velocity of the rotatable shaft and spring comprising a weight secured to said spring between said first and second portions thereof.

6. In an air-pressure controlling rotational-velocity-responsive mechanism for association with a rotatable shaft rotating at various velocities, body means having a chamber therein connectable to a source of air at a pressure differing from atmospheric, pneumatic valve means for controlling the flow of air through said chamber and including cooperating valve and valve seat portions, and means for adjustably controlling the position of one of said portions comprising a pivotable member pivotable about an axis and having a controlling portion controlling the position of said one of said portions and a controlled portion, and manually movable means engageable with said controlled portion for pivoting said member.

7. In an air-pressure controlling rotational-velocity-responsive mechanism for association with a rotatable shaft rotating at various velocities, body means having a chamber therein connectable to a source of air at a pressure differing from atmospheric, pneumatic valve means for controlling the flow of air through said chamber and including cooperating valve and valve seat portions, and means for adjustably controlling the position of one of said portions comprising a pivotable member pivotable about an axis and having a controlling portion controlling the position of said one of said portions and a controlled portion, and manually movable means engageable with said controlled portion for pivoting said member comprising a camming element engaging said controlled portion, a crank for moving said camming element along a line generally perpendicular to the pivotal axis of said member, and means for rotating said crank.

8. In an air-pressure controlling rotational-velocity-responsive mechanism for association with a rotatable shaft rotating at various velocities, body means having a chamber therein connectable to a source of air at a pressure differing from atmospheric, pneumatic valve means for controlling the flow of air through said chamber and including cooperating valve and valve seat portions, and means for adjustably controlling the position of one of said portions comprising a pivotable member pivotable about an axis and having a controlling portion and controlling the position of said one of said portions and a controlled portion, and manually movable means engageable with said controlled portion for pivoting said member comprising a camming element engaging said controlled portion, a crank for moving said camming element along a line generally perpendicular to the pivotal axis of said member, and means for rotating said crank comprising a flexible shaft having one end rigidly fixed to said crank.

9. The combination of claim 8 in which said camming element is a ball and in which said body means includes a ball guide accepting and guiding said ball during movement thereof.

10. The combination of claim 8 further including means for shifting said pivotal axis in a direction perpendicular to said pivotal axis for calibrating the mechanism.

11. In an air-pressure controlling rotational-velocity-responsive mechanism for association with a rotatable shaft rotating at various velocities, body means having a chamber therein connectable to a source of air at a pressure differing from atmospheric, pneumatic valve means for controlling the flow of air through said chamber and including cooperating valve and valve seat portions, one of said portions comprising a flexible and resilient diaphragm constituting a portion of the wall of said chamber and having a peripheral edge portion sealingly secured to said body means and pretensioned to tend to move in one direction and a central portion, rotational-velocity-responsive means for exerting a force on the other one of said portions which varies over a range in accordance with the volocity of rotation of the rotatable shaft, and means for adjustably controlling the position of said one of said portions comprising a pivotable member pivotable about an axis and having a controlling portion disposed in said one direction from and engaging said central portion for controlling the position of said one of said portions and a controlled portion, and manually movable means engageable with said controlled portion for pivoting said member.

12. The combination of claim 11 in which said pivotable member deflects said diaphragm from its free position and pretensions said diaphragm and in which said one portion continuously exerts a force upon said pivotable member due to said pretensioning.

13. In an air-pressure controlling rotational-velocity-responsive mechanism for association with a rotatable shaft rotating at various velocities, body means having a chamber therein connectable to a source of air at a pressure differing from atmospheric, pneumatic valve means for controlling the flow of air through said chamber and including cooperating valve and valve seat portions, one of said portions comprising a flexible and resilient diaphragm constituting a portion of the wall of said chamber and having a peripheral edge portion sealingly secured to said body means and pretensioned to tend to move in one direction and a central portion, rotational-velocity-responsive means for exerting a force on the other one of said portions which varies over a range in accordance with the velocity of rotation of the rotatable shaft, and means for adjustably controlling the position of said one of said portions comprising a pivotable member pivotable about an axis and having a controlling end portion at one side of said axis and disposed in said one direction from and engaging said central portion for controlling the position of said one of said portions and a controlled end portion at the other side of said axis, and manually movable means engageable with said controlled end portion for pivoting said member comprising a ball engaging said controlled end portion, a crank for moving said ball along a line generally perpendicular to the pivotal axis of said rotatable member and means for rotating said crank comprising a flexible shaft having one end rigidly fixed to said crank.

14. The combination of claim 13 in which said central portion has a chisel edge projecting therefrom in said one direction, in which said controlling end portion engages said chisel edge, and in which said pivotal axis is substantially parallel with said chisel edge.

15. In an air-pressure controlling rotational-velocity-responsive mechanism, body means having a chamber therein connectable to a source of air at a pressure differing from atmospheric, rotatable shaft means, pneumatic valve means for controlling the flow of air through said chamber and including cooperating pneumatic valve and valve seat portions, manually adjustable positioning means having a portion adjustably spaced from one wall portion of said body means for varying the distance between one of said pneumatic valve portions and said one wall portion of said body means comprising a lever pivotal about a pivot member which is adjustable to move the pivotal axis of said lever toward and away from said one wall portion, means for exerting a force upon the other one of said pneumatic valve portions which varies in accordance with the rotational velocity of said shaft means comprising a generally annular spring disposed within said chamber, weight means secured to said spring, and means for drivingly interconnecting said shaft means and said spring, and means for calibrating said mechanism comprising means for changing the distance between said portion of said positioning means and said one wall portion and including said pivot member.

16. In an air-pressure controlling rotational-velocity-responsive mechanism, body means having a chamber therein connectable to a source of air at a pressure differing from atmospheric, rotatable shaft means, pneumatic valve means for controlling the flow of air through said chamber and including cooperating pneumatic valve and valve seat portions, manually adjustable positioning means having a portion adujstably spaced from one wall portion of said body means for varying the distance between one of said pneumatic valve portions and said one wall portion of said body means, said one wall portion having a central section and a relatively thin-walled portion disposed radially outwardly of said central section, means for exerting a force upon the other one of said pneumatic valve portions which varies in accordance with the rotational velocity of said shaft means comprising a generally annular spring disposed within said chamber, weight means secured to said spring, and means for drivingly interconnecting said shaft means and said spring, and means for calibrating said mechanism comprising means for changing the distance between said portion of said positioning means and said one wall portion and including said thin-walled portion, the distance between said central section and said portion of said positioning means being changed by bending said thin-wall portion.

References Cited in the file of this patent

UNITED STATES PATENTS

| | | |
|---|---|---|
| 2,104,151 | Brisbane | Jan. 4, 1938 |
| 2,441,811 | Gottlieb | May 18, 1948 |

FOREIGN PATENTS

| | | |
|---|---|---|
| 283,219 | Germany | Apri. 3, 1915 |
| 692,849 | France | Oct. 11, 1930 |